(12) United States Patent
Nishihara

(10) Patent No.: US 9,277,154 B2
(45) Date of Patent: *Mar. 1, 2016

(54) IMAGE TAKING DEVICE AND CAMERA SYSTEM

(71) Applicant: Sony Corporation, Tokyo (JP)

(72) Inventor: Toshiyuki Nishihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/583,885

(22) Filed: Dec. 29, 2014

(65) Prior Publication Data

US 2015/0108330 A1    Apr. 23, 2015

Related U.S. Application Data

(60) Continuation of application No. 13/940,963, filed on Jul. 12, 2013, now Pat. No. 8,953,072, which is a division of application No. 12/890,214, filed on Sep. 24, 2010, now Pat. No. 8,493,483.

(30) Foreign Application Priority Data

Oct. 1, 2009  (JP) .................................. 2009-229893

(51) Int. Cl.
  *H04N 5/335*    (2011.01)
  *H04N 5/3745*   (2011.01)
  *H04N 5/32*     (2006.01)
  *H04N 5/355*    (2011.01)
  (Continued)

(52) U.S. Cl.
  CPC .............. *H04N 5/37455* (2013.01); *G01J 1/44* (2013.01); *H04N 5/32* (2013.01); *H04N 5/3355* (2013.01); *H04N 5/355* (2013.01); *H04N 5/357* (2013.01); *H04N 5/3535* (2013.01); *H04N 5/363* (2013.01); *H04N 5/378* (2013.01); *H04N 5/3742* (2013.01); *G01J 2001/444* (2013.01)

(58) Field of Classification Search
  None
  See application file for complete search history.

(56) References Cited

U.S. PATENT DOCUMENTS 6,657,665 B1   12/2003  Guidash
7,361,881 B2   4/2008   Sparitois
(Continued)

FOREIGN PATENT DOCUMENTS

CN    101521246 A    9/2009
EP    0205624        12/1986
(Continued)

OTHER PUBLICATIONS

European Search Report issued on Jul. 27, 2012 in connection with counterpart EP application No. 179238.

(Continued)

*Primary Examiner* — Twyler Haskins
*Assistant Examiner* — Angel L Garces-Rivera
(74) *Attorney, Agent, or Firm* — Dentons US LLP

(57) ABSTRACT

An image sensor includes a plurality of pixels, a plurality of sense circuits, and a count circuit. Each sense circuit is configured to read out electrical signals from at least one pixel associated with the sense circuit in order to generate data representing whether or not photons have been received by the sense circuit. The count circuit is in communication with a sense circuit selected from the plurality of sense circuits. The count circuit is configured to provide integration results for the pixels associated with the sense circuits based on the data received from the sense circuits.

23 Claims, 9 Drawing Sheets

(51) Int. Cl.
*H04N 5/357* (2011.01)
*H04N 5/363* (2011.01)
*H04N 5/374* (2011.01)
*H04N 5/378* (2011.01)
*G01J 1/44* (2006.01)
*H04N 5/353* (2011.01)

(56) References Cited

U.S. PATENT DOCUMENTS

2002/0196170 A1 12/2002 McIlrath
2003/0206236 A1 11/2003 Levantovsky

FOREIGN PATENT DOCUMENTS

| | | |
|---|---|---|
| EP | 2302905 | 3/2011 |
| JP | 07-067043 | 3/1995 |
| JP | 07-311271 | 11/1995 |
| JP | 2004-193675 | 7/2004 |
| JP | 2008-141610 | 6/2008 |
| JP | 2008-259228 | 10/2008 |
| JP | 2008-538606 | 10/2008 |
| JP | 2009-038834 | 2/2009 |
| JP | 2009-206709 | 9/2009 |
| WO | WO/2004/099865 | 11/2004 |

OTHER PUBLICATIONS

European Search Report issued on Nov. 13, 2012 in connection with counterpart EP Application No. 11 007227.
Japanese Office Action issued in connection with related Japanese counterpart Japanese Patent application No. 2010-224235 dated Mar. 4, 2014.
Chinese Office Examination Report issued in connection with related Chinese Patent Application No. 201010290397.4 dated Feb. 16, 2015.

F I G . 2
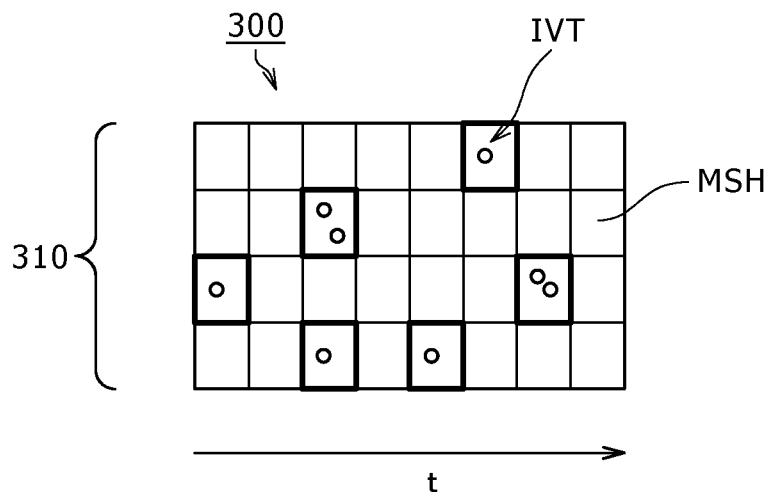
F I G . 3
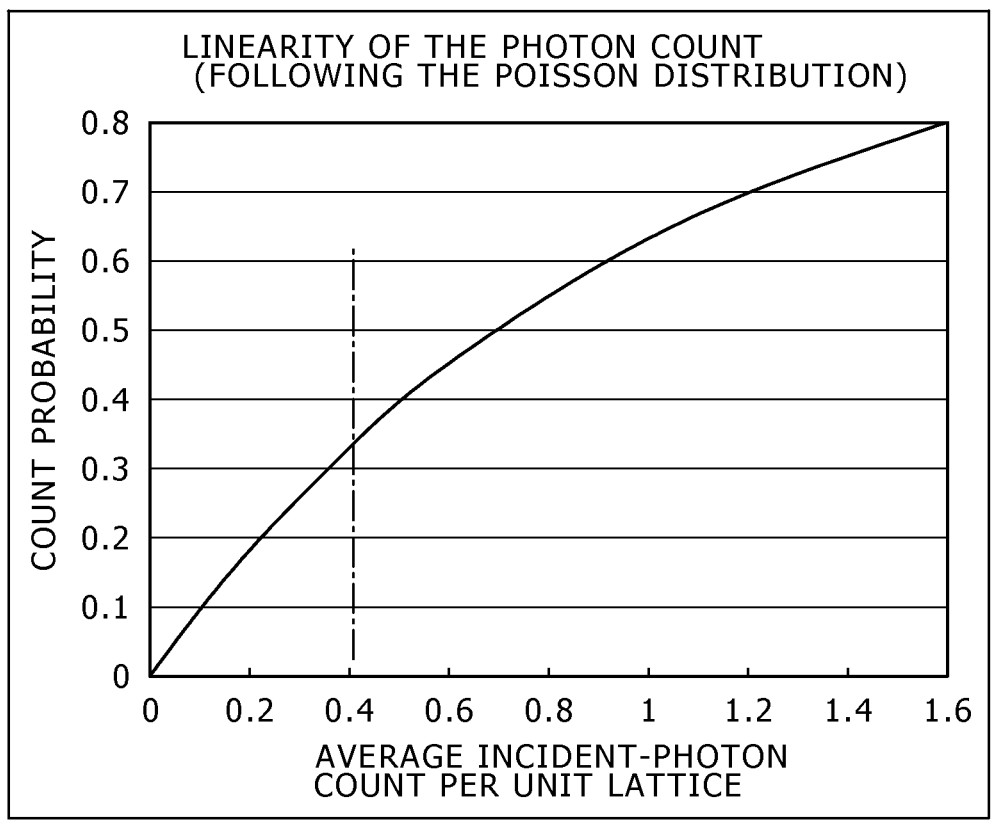

FIG. 6
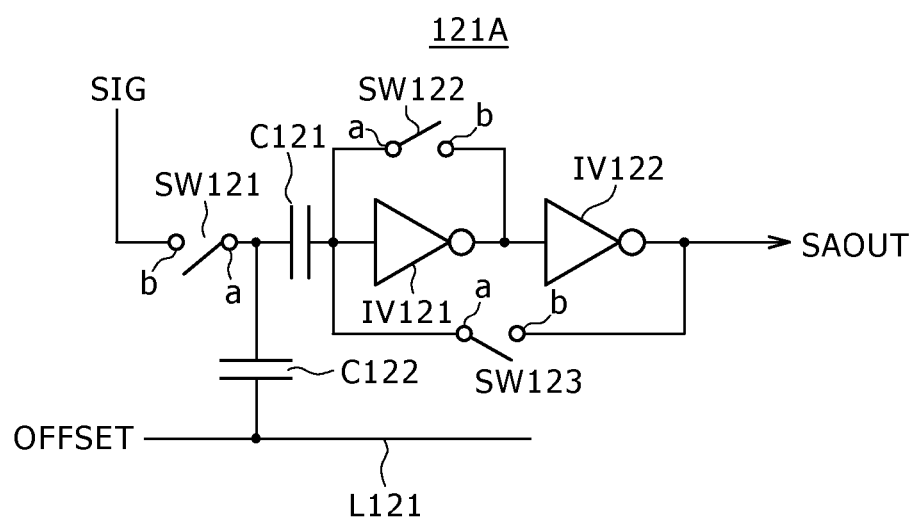
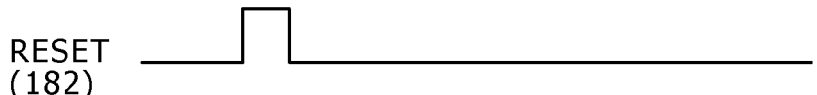
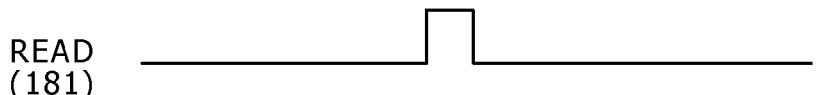

IMAGE TAKING DEVICE AND CAMERA SYSTEM

RELATED APPLICATION DATA

This application is a continuation of U.S. patent application Ser. No. 13/940,963 filed Jul. 12, 2013, which is a division of U.S. patent application Ser. No. 12/890,214 filed Sep. 24, 2010, now U.S. Pat. No. 8,493,483 issued Jul. 23, 2013 the entireties of which are incorporated herein by reference to the extent permitted by law. The present application claims priority to Japanese Priority Patent Application JP 2009-229893 filed in the Japan Patent Office on Oct. 1, 2009, which is incorporated by reference in its entirety to the extent permitted by law.

BACKGROUND OF THE INVENTION

The present invention relates to image taking devices such as a CMOS (Complementary Metal Oxide Semiconductor) image sensors and camera systems employing same.

In recent years, techniques for measuring minute amounts of light emitted by or from a biological body and fluorescent light, as well as techniques for taking images, have been developed in the fields of medical cares and biotechnologies.

In addition, a transmission image taking technology has been applied to products in the medical-care and security fields. In accordance with the transmission image taking technology, few X rays passing through an object of observation are converted by a scintillator into photons at the visible level and the photons are then detected in order to take an image of the object under observation.

In an image taking process carried out in such fields, a photon counter is used for measuring the minute amount of light.

Usually, the photon counter is a simple device which makes use of an avalanche diode or a photoelectron multiplying tube.

The device serving as the photon counter converts every photon incident on a light receiving surface of the device into a photoelectron and accelerates the photoelectron by the electric field thus multiplies the number of photoelectrons by, among others, secondary-electron generations due to collisions. Then, the device generates voltage pulses from the photoelectrons.

A counter apparatus connected at any point in time to the device serving as the photon counter counts the number of voltage pulses.

The photon counter has an excellent measurement precision which allows the photon counter to detect every photon. On the other side of the coin, however, a system employing the photon counter is expensive and the dynamic range of a measurement process is narrow.

Normally, the number of photo electrons that can be measured by a photon counter is about 1 million to 10 millions.

For an image taking process with a relatively large range of measured-light quantities, on the other hand, a photodiode and an AD (Analog to Digital) converter are used.

The photodiode is used for accumulating electric charge obtained as a result of an opto-electrical conversion process and for generating an analog signal. Then, the AD converter converts the analog signal into a digital signal.

However, the image taking process as described above raises problems. One of the problems is noises generated in propagation of the analog signal. Another problem is the speed of the AD converter.

In a process of detecting light having a small amount, it is necessary to reduce generated noises and increase the bit count of the AD conversion in order to improve the resolution of the digital signal. For this reason, an AD converter having an extremely high conversion speed is required. In addition, in order to improve the resolution of the taken image, it is necessary to increase the number of pixels of the image. Thus, the size of a system for AD conversion is very large.

For more information, refer to Japanese Patent Laid-open Nos. 1995-67043 and 2004-193675 (hereinafter referred to as Patent Documents 1 and 2, respectively).

In the nature of things, an operation to take an image emitting little light needs to be carried out by detecting the light with a high degree of precision by reduction of noises generated in the operation and also carried out at a large dynamic range.

However, there is no device that meets both of these requirements.

In an attempt to reduce the amount of contamination caused by an X-ray image taking operation for example, precision of the same level as a photon counter is required. By making use of an ordinary photon counter, however, a dynamic range sufficient for the image taking operation is not satisfied.

In addition, in order to improve the resolution, a multi-pixel system including a counter apparatus is demanded. However, such a system is extremely expensive.

As disclosed in Patent Document 1, on the other hand, there is proposed a new technique for counting the number of photons on a time-division basis.

In accordance with the technique, a binary value is produced to serve as a result of determination as to whether or not an incident photon has hit a photodiode in a time period determined in advance. The process to produce such a binary value is carried out for every photodiode and the values are integrated to give two-dimensional image taking data.

That is to say, a signal generated by a photodiode is sensed in each time period determined in advance and, if the number of photons incident on the photodiode as indicated by the signal during the time period is at least 1, a counter connected to a pixel corresponding to the photodiode is incremented by 1 regardless of the number of photons incident on the photodiode.

If the frequency of the photon incidence on the photodiode varies at random along the time axis, the number of actual incident photons and the contents of the counter follow the Poisson distribution. Thus, for a low frequency of the photon incidence, the relation between the number of actual incident photons and the contents of the counter is linear. Even if the frequency is high, the relation between the number of actual incident photons and the contents of the counter can be corrected in a uniform manner.

In accordance with the technology disclosed in Patent Document 1, however, every pixel requires a sense circuit and a counter so that the aperture area of the pixel inevitably becomes very small.

Patent Document 2 mentioned earlier proposes a configuration in which a counting technique based on time division is adopted and counters are provided outside an array of pixels which each require a sense circuit and a memory.

In addition, in spite of the fact that the counters can be provided outside the array of pixels, every pixel requires one of the counters. Thus, the circuit size of a chip including the counters is unavoidably large.

On top of that, in the configurations disclosed by Patent Documents 1 and 2, an attempt can be made to increase the dynamic range only by shortening the interval to measure incident photons along the time axis and by increasing the speed of accesses to the pixels.

SUMMARY OF THE INVENTION

Embodiments of the present invention overcome the foregoing deficiencies with an innovative image taking device that allows a light-quantity measurement process and an image taking process that generate little noise even at a low illumination intensity to be carried out at a large dynamic range. Embodiments may include an innovative camera system which may employ the image taking device.

According to one embodiment, an image sensor includes a plurality of pixels, a plurality of sense circuits, and a count circuit. Each pixel is configured to output an electrical signal in accordance with a photon incident on the pixel within a predetermined time period. Each sense circuit is configured to read out electrical signals from at least one pixel associated with the sense circuit in order to generate data representing whether or not photons have been received by the sense circuit within the predetermined time period. The count circuit is configured to be in communication with a sense circuit selected from the plurality of sense circuits. The count circuit is configured to provide integration results for the pixels associated with the sense circuits based on the data received from the sense circuits.

According to an embodiment, an electronic system includes an optical system and an image sensor. The optical system includes a lens. The image sensor is configured to receive incident light from the optical system. The image sensor includes a plurality of pixel blocks, a plurality of sense circuits, and a count circuit. Each pixel block includes a set of pixels connected to a common signal line. Each pixel is configured to output an electrical signal in accordance with a photon incident on the pixel. Each sense circuit is associated with a respective pixel block. Each sense circuit being configured to read out the electrical signals from the set of pixels. Each sense circuit being configured to generate, for each pixel within the set of pixels, data indicating whether or not photons have been received by the pixel. The count circuit is in selective communication with the plurality of sense circuits. The count circuit is configured to provide integration results based upon the data received from each selected sense circuit of the plurality of sense circuits.

According to one embodiment, a method includes performing a first access operation on a first pixel, and performing a second access operation on the first pixel. The method includes performing a first count operation for the first pixel. The first count operation occurs between the first access operation of the first pixel and the second access operation of the first pixel. The first access operation is performed on a second pixel. The first access operation of the second pixel is configured to occur prior to the second access operation of the first pixel.

According to an embodiment, a method includes performing a first count operation and a second count operation. The first count operation is performed based on binary values received from a first sense circuit associated with a first pixel. The second count operation is performed based on binary values received from a second sense circuit associated with a second pixel. The first count operation and the second count operation are performed by a common count circuit.

In accordance with embodiments of the present invention, it is possible to carry out a light-quantity measurement process and an image taking process at a large dynamic range without reducing the pixel aperture ratio by processing no analog signals and by generating only few noises even at a low illumination intensity.

BRIEF DESCRIPTION OF THE DRAWINGS

These and other innovations as well as features of the present invention will become clear from the following description of preferred embodiments given with reference to accompanying diagrams, in which:

FIG. 2 is an explanatory diagram to be referred to in description of the concept of a light receiving section employed in the image taking device according to the first embodiment;

FIG. 3 is a diagram showing a relation between an average incident-photon count representing the number of photons incident on a unit lattice corresponding to a mesh of the light receiving section shown in the diagram of FIG. 2 and a count probability;

FIG. 6 is a circuit diagram showing a sense circuit having a self referencing function;

FIGS. 7A to 7F are timing diagram showing a plurality of timing charts to be referred to in explanation of read operations carried out by the sense circuit shown in the circuit diagram of FIG. 6 to serve as a sense circuit having a self referencing function by taking the pixel shown in the circuit diagram of FIG. 4 as an example;

DETAILED DESCRIPTION OF THE PRESENTLY PREFERRED EMBODIMENTS

Figure 1:
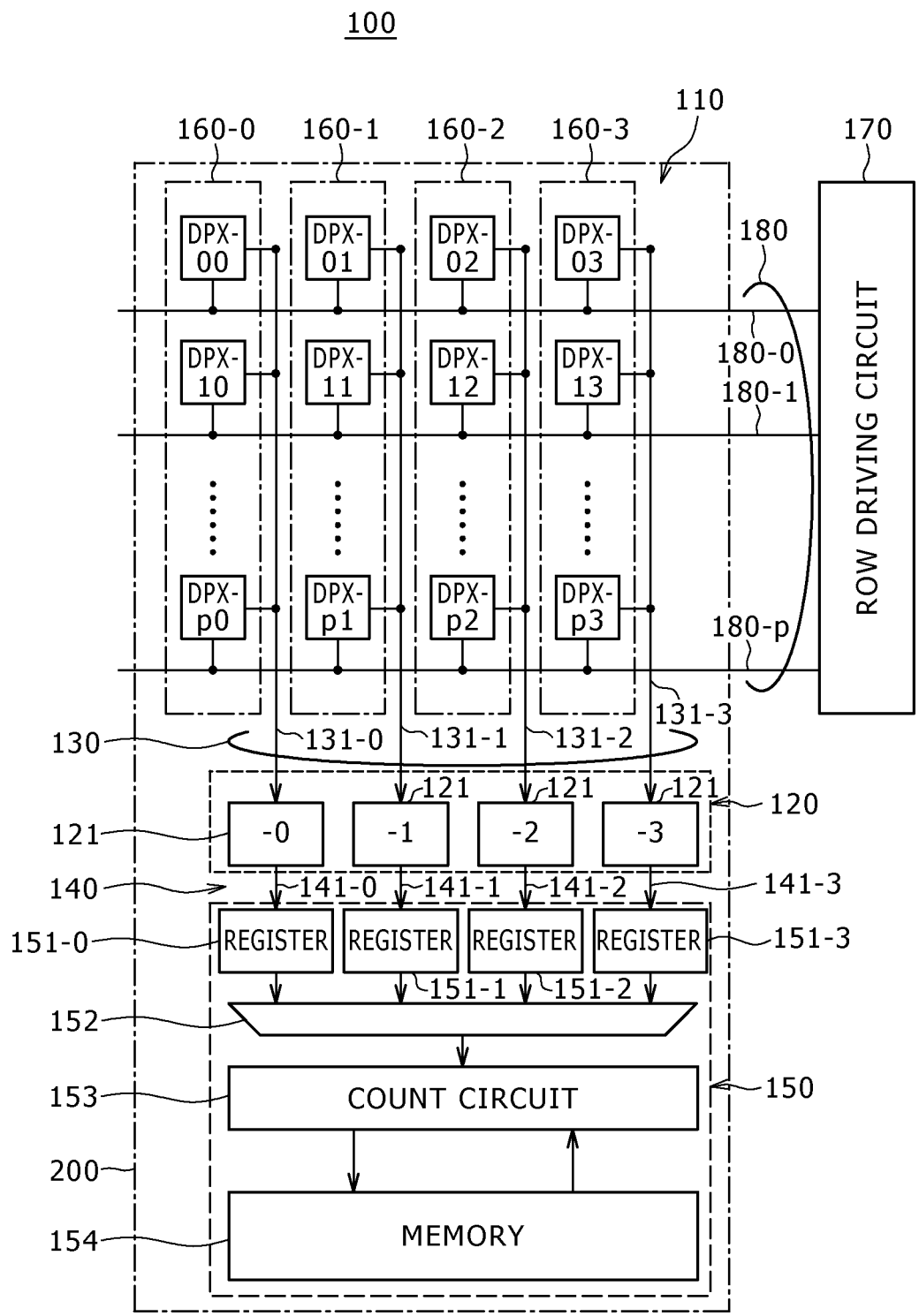
FIG. 1 is a block diagram showing a configuration of a CMOS image sensor serving as an image taking device according to a first embodiment of the present invention.

Preferred embodiments of the present invention are explained below by referring to diagrams. It is to be noted that the preferred embodiments are described in chapters which are arranged as follows.
1. Overview of characteristics of image taking devices according to embodiments
2. First embodiment (first configuration of the image taking device)
3. Second embodiment (second configuration of the image taking device)

4. Third embodiment (exemplary application of the image taking device)
5. Fourth embodiment (camera system)

1. Overview of Characteristics of Image Taking Devices According to Embodiments Every embodiment of the present invention implements an optimum configuration of a CMOS image sensor which serves as an image taking device. The CMOS image sensor is a full digital image sensor which counts the number of incident photons in order to implement a high-speed parallel read operation.

First of all, every pixel of the CMOS image sensor outputs an electrical signal which indicates whether or not a photon has hit the pixel during a time period determined in advance. Then, a sense circuit receives the electrical signals a plurality of times in order to generate a binary value representing a result of determination as to whether or not photons have hit the pixels associated with the sense circuit during a 1-frame time period. The image taking device then integrates the binary values typically in order to generate gradation data for every pixel.

The image taking device according to every embodiment has a unique/peculiar configuration based on the fundamental configuration described above.

A time-division photon counting operation carried out by the image taking device is an operation to change a photon detection process to a detection process repeated for every cycle determined in advance in order to relieve the system from the need to monitor pulses generated due to incident photons all the time.

Paying attention to the time-division photon counting operation, the inventors of the present invention have devised every embodiment to abandon a configuration in which each pixel is provided with a sense circuit and a counter. Instead, three elements (that is, the pixel, the sense circuit and the counter) are put in a hierarchical structure.

That is to say, premising the time-division photon counting operation, in every embodiment, a plurality of pixels share one common sense circuit and/or a plurality of such sense circuits share one common count circuit.

In every embodiment, typically, electrical signals are read out cyclically by a common sense circuit from a plurality of pixels sharing the sense circuit common to the pixels whereas an exposure is implemented during a time period between the immediately preceding read operation and the present read operation. Thus, the sharing of the common sense circuit by a plurality of pixels does not put pressure on the time period of the exposure.

In addition, while an operation to count (or integrate) the results of determination and/or an operation to store data resulting from the determination-result counting operation in a memory are being carried out, the next exposure can be started. Thus, even though the sharing of one common count circuit by a plurality of sense circuits increases the time it takes to carry out the operation to count the results of determination, the sharing of one common count circuit also does not put pressure on the time period of the exposure. In the following description, the operation to count the results of determination is also referred to as a photon counting operation.

On top of that, in every embodiment, a sum of results of photon counting operations carried out on a plurality of pixels is found, increasing the dynamic range of the photon counting operation.

If a sum of results of photon counting operations carried out on a plurality of pixels sharing a common count circuit is found, however, the sum of the results obtained for different pixels can be stored at the same address in a memory. Thus, the operation can be carried out very easily.

In addition, the image taking device having a pixel array section functioning as a light receiving section is provided with a function for finding a sum of results of photon counting operations carried out on the entire light receiving section in order to compute the total quantity of light incident on the image taking device. It is possible to easily implement the function by typically providing a separate external adder in close proximity to a data outputting section of the image taking device.

On top of that, the light receiving section can be configured to employ pixels laid out to form a line of pixels or a matrix of pixels and the line of pixels or the matrix of pixels can each be used as a light detection unit. Thus, light can be detected very finely. In addition, the image taking operation can be carried out at a large dynamic range.

In accordance with the embodiments each having the configuration described above, the size of a circuit required for the photon counting process can be reduced dramatically. In addition, by utilizing a technology for miniaturizing the semiconductor image taking device, it is possible to carry out the photon counting operation at a high performance on a large number of pixels.

The dynamic range of the photon counting operation is determined by the total number of meshes resulted from two kinds of division, i.e., division in the time-axis direction and division of a light incidence surface. For each of the meshes, a binary value is generated as a value which represents the result of determination.

The resolution determined by the number of meshes and the dynamic range of the photon counting operation can be improved by both miniaturization and an increased speed which are made possible by the semiconductor manufacturing technology.

An image taking device according to each of the embodiments is a unit which is by itself capable of carrying out a process of detecting the quantity of received light with a high degree of precision and a process of taking an image. In addition, a plurality of such image taking devices each serving as a light receiving device can be laid out to form an image taking system which is capable of carrying out an image taking process with a high degree of precision at a large dynamic range.

Since the light receiving device has an embedded photon counting function, a camera system employing the image taking device can be constructed with ease without making use of an expensive external apparatus.

In addition, the photon counting function of the light receiving device is carried out to directly count the number of photons incident on the image taking device by adoption of a full digital technique. Thus, there are almost no variations in sensitivity among the light receiving devices as is the case with an ordinary analog imager. That is to say, it is not necessary to provide a section for eliminating the variations in sensitivity among the light receiving devices.

For example, if the image taking device according to each of the embodiments is used in conjunction with a scintillator to carry out a transmission image taking operation by making use of only few X rays, it is possible to reduce the amount of contamination. It is also possible to raise the precision and resolution of the transmission image taking operation carried out by making use of X rays. In addition, the price of a system employing the image taking device according to each of the embodiments and the scintillator is extremely low.

The following description explains details of CMOS image sensors each serving as an image taking device according to one of the embodiments which have the characteristics described above.

2. First Embodiment

FIG. 1 is a block diagram showing a configuration of a CMOS image sensor 100 serving as an image taking device according to a first embodiment of the present invention.
Outline of the Entire Configuration As shown in the figure, the CMOS image sensor 100 employs a pixel array section 110, a sense circuit section 120, an output-signal line group 130, a transfer line group 140 and a determination-result integration circuit section 150.

As will be described later, in the CMOS image sensor 100, a plurality of pixels share one sense circuit.

In addition, in the CMOS image sensor 100, each plurality of pixels DPX pertaining to a column and a pixel select circuit (not shown in the drawing) for selecting one of the pixels DPX from one of pixel blocks 160-0, 160-1, 160-3 and so on.

On top of that, the CMOS image sensor 100 has a row driving circuit 170 and a row control line group 180. The row driving circuit 170 is a section for driving each pixel DPX employed in the pixel array section 110 to output an electrical signal generated by the driven pixel DPX to an output signal line 131.

The pixel array section 110 includes a plurality of digital pixels DPX which are arranged in the row and column directions to form a matrix.

Each of the digital pixels DPX employs an opto-electrical conversion element having a function for converting light incident on the opto-electrical conversion element into an electrical signal.

As described above, a plurality of pixels DPX pertaining to a column and a pixel select circuit form each of the pixel blocks 160-0, 160-1, 160-3 and so on.

The CMOS image sensor 100 includes a circuit block 200. The circuit block 200 generates a binary value for an electrical signal propagating through an output signal line 131 as a result of determination during a time period determined in advance, integrates a plurality of aforementioned determination results a plurality of times for each of the digital pixels, computes a sum of integration results of a plurality of the digital pixels, and generates two-dimensional image taking data which typically includes a gradation.

The CMOS image sensor 100 also integrates a plurality of aforementioned determination results for each of pixel blocks 160 each including a plurality of digital pixels DPX a plurality of times in order to compute the quantity of light incident on the pixel array section 110 which serves as the light receiving section. In the CMOS image sensor 100 according to the first embodiment shown in the block diagram of FIG. 1, the pixel blocks 160 are pixel blocks 160-0, 160-1, 160-2, 160-3 and so on.

The CMOS image sensor 100 also has a function to increase the dynamic range of a photon counting operation by finding a sum of counting results each obtained for a plurality of digital pixels DPX.

As is obvious from the above description, the circuit block 200 includes the pixel array section 110, the sense circuit section 120 and the determination-result integration circuit section 150.

In the case of the first embodiment shown in the block diagram of FIG. 1, the sense circuit section 120 employs a plurality of sense circuits 121-0, 121-1, 121-2, 121-3 and so on which are associated with respectively the pixel blocks 160-0, 160-1, 160-2, 160-3 and so on included in the pixel array section 110.

The sense circuit 121-0 is connected to an output signal line 131-0 which is wired to the output nodes of all pixels DPX-00, DPX-10 to DPX-p0 pertaining to the pixel block 160-0 to serve as an output signal line common to the output nodes.

That is to say, a plurality of pixels DPX-00 to DPX-p0 share the sense circuit 121-0.

It is to be noted that the number of pixels included in each of the pixel blocks 160-0, 160-1, 160-2, 160-3 and so on is set at typically the integer 128. That is to say, each of the pixel blocks 160-n includes pixels DPX-pn where p=0 to 127. For example, for n=0, the pixel block 160-0 includes pixels DPX-00 to DPX-1270.

By the same token, the sense circuit 121-1 is connected to an output signal line 131-1 which is wired to the output nodes of all pixels DPX-01, DPX-11 to DPX-p1 pertaining to the pixel block 160-1 to serve as an output signal line common to the output nodes.

That is to say, a plurality of pixels DPX-01 to DPX-p1 share the sense circuit 121-1.

For p=0 to 127, the pixel block 160-1 includes 128 pixels DPX-01 to DPX-1271.

In the same way, the sense circuit 121-2 is connected to an output signal line 131-2 which is wired to the output nodes of all pixels DPX-02, DPX-12 to DPX-p2 pertaining to the pixel block 160-2 to serve as an output signal line common to the output nodes.

That is to say, a plurality of pixels DPX-02, DPX-12 to DPX-p2 share the sense circuit 121-2.

For p=0 to 127, the pixel block 160-2 includes 128 pixels DPX-02 to DPX-1272.

Likewise, the sense circuit 121-3 is connected to an output signal line 131-3 which is wired to the output nodes of all pixels DPX-03, DPX-13 to DPX-p3 pertaining to the pixel block 160-3 to serve as an output signal line common to the output nodes.

That is to say, a plurality of pixels DPX-03 to DPX-p3 share the sense circuit 121-3.

For p=0 to 127, the pixel block 160-3 includes 128 pixels DPX-03 to DPX-1273.

The sense circuit section 120 includes other sense circuits not shown in the block diagram of FIG. 1. Each of these other sense circuits is shared by a plurality of pixels as a sense circuit common to the pixels pertaining to another pixel block which is also not shown in the block diagram of FIG. 1.

The determination-result integration circuit section 150 has a function to integrate a plurality of determination results, which have been produced by the sense circuits 121-0 to 121-3, a plurality of times for each of the pixels. The determination-result integration circuit section 150 also has a function to compute a sum of integration results each obtained for a plurality of pixels in order to generate two-dimensional image taking data which typically includes a gradation for each of the pixels.

The determination-result integration circuit section 150 also has a function to integrate a plurality of aforementioned determination results for each of pixel blocks 160 each including a plurality of pixels a plurality of times in order to compute the quantity of light incident on the pixel array section 110 which serves as the light receiving section. In the CMOS image sensor 100 according to the first embodiment shown in the block diagram of FIG. 1, the pixel blocks 160 are pixel blocks 160-0, 160-1, 160-2, 160-3 and so on.

As shown in the block diagram of FIG. 1, the determination-result integration circuit section 150 employs registers 151-0 to 151-3, a register select circuit 152, a count circuit 153 and a memory 154.

The registers 151-0 to 151-3 are used for storing determination results which are produced by the sense circuits 121-0 to 121-3 respectively and transferred to the registers 151-0 to 151-3 through respectively transfer lines 141-0 to 141-3.

The register select circuit 152 is a section for sequentially selecting the determination results stored in the registers 151-0 to 151-3 and supplying the selected result of determination to the count circuit 153.

The count circuit 153 carries out an integration (counting) operation sequentially on the determination results, which are each obtained for one of a plurality of pixel blocks 160 and each received selectively from the register select circuit 152, in order to generate an integration result. As shown in the block diagram of FIG. 1, there are four circuit blocks 160-0 to 160-3. The count circuit 153 supplies the integration result to the memory 154 which is used for storing the integration result for every pixel.

The count circuit 153 also finds a sum of integration results computed for a plurality of pixels and stores the sum in the memory 154.

The count circuit 153 loads pixel data, which has been stored in the memory 154 in a previous pixel read operation, from the memory 154.

As is obvious from the above description, the determination-result integration circuit section 150 employed in the CMOS image sensor 100 according to the first embodiment of the present invention has one count circuit 153 serving as a common count circuit which is shared by the registers 151-0 to 151-3. In other words, the CMOS image sensor 100 according to the first embodiment of the present invention has one count circuit 153 serving as a common count circuit which is shared by a plurality of sense circuits, i.e., the sense circuits 121-0 to 121-3.

The CMOS image sensor 100 according to the first embodiment of the present invention has the unique/peculiar configuration described above.

That is to say, an access to pixels is made by a common sense circuit cyclically so that the CMOS image sensor 100 is capable of keeping up with pixels, each having an even smaller size while sustaining a sufficient length of the exposure time.

In addition, the CMOS image sensor 100 is so configured that a count circuit (determination-result integration circuit section) is shared by a plurality of sense circuits. Thus, the CMOS image sensor 100 is designed to have a configuration which allows flexible optimization for a desired circuit size and a desired processing speed.

The CMOS image sensor 100 has a function to increase the dynamic range of a photon counting operation by finding a sum of counting results each obtained for a plurality of pixels.

Next, by referring to diagrams of FIGS. 2 and 3, the following description explains the basic concepts of a light receiving process and a photon counting process which are carried out by the light receiving section 300 implemented by the pixel array section 110 included in the circuit block 200 of the CMOS image sensor 100 according to the embodiment.

FIG. 2 is an explanatory diagram referred to in description of the concept of the light receiving section 300 according to the first embodiment.

FIG. 3 is a diagram showing a relation between an average incoming-photon count representing the number of photons incident on a unit lattice corresponding to a mesh of the light receiving section shown in the diagram of FIG. 2 and a count probability.

It is to be noted that, in order to merely make the diagram of FIG. 2 simpler, the light receiving surface of the light receiving section 300 which naturally has a two-dimensional form is shown as a one-dimensional light receiving surface 310 of the light receiving section 300.

The light receiving surface 310 of the light receiving section 300 is divided into a plurality of segments having the same length. By the same token, the time axis t is also divided into a plurality of segments having the same length. A photo counting process is carried out with a three-dimensional mesh MSH formed by the divided light receiving surface 310 and the divided time axis t (shown in a two-dimensional form in the figure).

Every mesh MSH is associated with a binary value. That is to say, for every mesh MSH, the sense circuit section 120 produces a binary value which represents a result of determination as to whether or not one or more photons have hit the mesh MSH. If the result of the determination indicates that photons have hit a mesh MSH, the binary value associated with the mesh MSH is set at 1 without regard to the number of photons that have hit the mesh MSH. If the result of the determination indicates no photons have hit a mesh MSH, on the other hand, the binary value associated with the mesh MSH is set at 0. In the diagram of FIG. 2, a mesh MSH associated with the binary value of 1 is shown as a bold-line square block. In addition, in the diagram of FIG. 2, a circle represents a photon incidence event IVT. The number of circles enclosed in a mesh MSH is the number of photons that have hit the mesh MSH.

The determination-result integration circuit section 150 counts the total number of meshes MSH each associated with a binary value which is set at 1 and stores the total number of meshes MSH in the memory 154.

Here, it is assumed that photons hit the light receiving section 300 almost uniformly on the average while the number of incident photons is swaying along the time axis t and hit the light receiving section 300 almost uniformly on the average in the surface direction. In this case, a relation between the total count and the number of actual incident photons follows the Poisson distribution.

As described above, FIG. 3 is a diagram showing a relation between an average incoming-photon count representing the number of photons incident on a unit lattice CL corresponding to a mesh and a count probability.

As shown in the diagram of FIG. 3, in an area hit by light having a small quantity at an average incoming-photon count not exceeding 0.1, the incoming-photon count matches the count with a high degree of precision.

In an area hit by light at an average incoming-photon count not exceeding 0.4, on the other hand, the relation between the incoming-photon count and the count is almost linear.

That is to say, if the total number of lattices each corresponding to a mesh MSH is sufficiently larger than the incoming-photon count, the count value linearly reflects the incoming-photon count, indicating that a counting operation can be carried out with a high degree of precision.

In addition, the total number of lattices can be increased by decreasing the mesh sizes in the surface direction and the direction of the time axis t. By raising the total number of lattices in this way, the precision of the count is improved and the dynamic range is increased.

That is to say, such a light receiving section 300 has a potential to allow the precision of the photon counting operation and the dynamic range to be dramatically enhanced by utilizing a miniaturization technology in the semiconductor manufacturing process and a technology for increasing the circuit speed.

It is to be noted that, if the incidence of light in the surface direction is locally biased to a large extent and the quantity of the incident light is relatively large for example, it is nice to provide a configuration which is described as follows.

Meshes laid out in the surface direction are treated by putting the meshes into a plurality of groups which each include at least one lattice segment. Then, for every group, the average number of lattices CL pertaining to the group is found. Finally, a correction process according to the Poisson distribution is carried out in order to improve the measurement precision.

As an alternative, there is provided an effective technique by which an optical low-pass filter is provided on the front surface of the light receiving surface 310 to serve as a filter for relieving the light receiving surface 310 from a bias of the incidence of light in the surface direction. In another alternative configuration, during a process of detecting X rays by making use of a scintillator, the scintillator radiates scattered light due to the incidence of X rays on the scintillator. Thus, the scintillator itself plays a role as an optical low-pass filter.

Functions of Digital Pixels

A configuration of the digital pixel DPX is explained below. In the following description, the digital pixel DPX is also referred to simply as a pixel.

As described before, the digital pixel DPX employs an opto-electrical conversion element for generating an analog electrical signal according to the incidence of an incoming photon on the digital pixel DPX.

The CMOS image sensor 100 serving as an image taking device has a function to reset the pixel DPX and a function to read out the electrical signal from the pixel DPX. The CMOS image sensor 100 is capable of carrying out the reset and read functions with arbitrary timings.

The reset function is a function to reset the pixel DPX to a state of receiving no incident light. All the pixels DPX are provided with a lens and, if necessary, a color filter. It is desirable to provide the lens and the color filter on the light receiving surface of the light receiving section which employs the pixels DPX.

The basic function of such a pixel is close to the function of an ordinary pixel. However, the pixel is not required to output the analog electrical signal with a high degree of precision and at good linearity.

A configuration of the digital pixel is described as follows.

Figure 4:
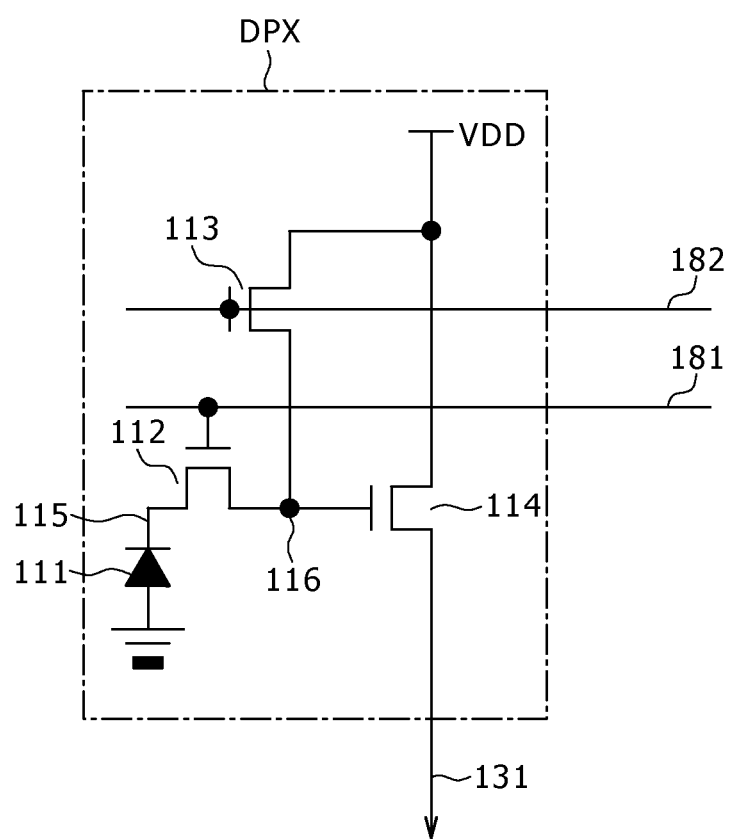
FIG. 4 is a circuit diagram showing a circuit configuration of a pixel according to the first embodiment.

FIG. 4 is a circuit diagram showing a circuit configuration of the pixel according to the first embodiment.

As shown in the circuit diagram of FIG. 4, the configuration of the pixel DPX serving as a unit pixel includes three transistors.

To put it in detail, the digital pixel DPX serving as a unit pixel employs a photodiode 111, a transfer transistor 112, a reset transistor 113, an amplification transistor 114, an accumulation node 115 and an FD (Floating Diffusion) node 116.

The gate electrode of the transfer transistor 112 is connected to a transfer line 181 serving as a row control line whereas the gate electrode of the reset transistor 113 is connected to a reset line 182 which also serves as a row control line.

The gate electrode of the amplification transistor 114 is connected to the FD node 116 whereas the source electrode of the amplification transistor 114 is connected to an output signal line 131.

In the pixel DPX, light incident on the silicon substrate of the pixel generates electron-hole pairs which each are composed of an electron and a hole. The photodiode 111 accumulates the electrons in the accumulation node 115.

With a timing determined in advance, the transfer transistor 112 is put in a turned-on state which causes the electrons to be transferred to the FD node 116. The electrons transferred to the FD node 116 drive the amplification transistor 114 to enter a turned-on state.

With the amplification transistor 114 put in a turned-on state, signal electric charge is read out from the digital pixel DPX as an electrical signal appearing on the output signal line 131 in a read operation.

As an alternative, the output signal line 131 can be connected to the ground through a constant-current source and a resistor in order to carry out a source-follower operation. As another alternative, prior to the read operation, the output signal line 131 is once connected to the ground in order to put the output signal line 131 in a temporary grounded state. Then, the output signal line 131 is put in a floating state in order to output a signal at a charge level set by the amplification transistor 114.

The reset transistor 113 is put in a turned-on state at the same time as the transfer transistor 112 in order to extract the electrons accumulated in the photodiode 111 to a power supply so that the pixel is reset in a dark state that prevailed prior to the accumulation of the electrons. The dark state is a state in which no photon is incident on the digital pixel DPX.

The circuit of the pixel and the effects of the operations carried out by the pixel may have a variety of variations as is the case with the analog pixel.

However, the analog pixel outputs an analog signal which represents the total number of incident photons. On the other hand, the digital pixel outputs a digital signal which indicates whether or not a photon has hit the digital pixel.

Thus, the design concept of the digital pixel is different from that of the analog pixel.

First of all, for a photon incident on a digital pixel, the digital pixel is required to generate an electrical signal which is large enough for the incidence of the photon on the digital pixel DPX.

In the pixel circuit including the amplification transistor 114 as shown in the circuit diagram of FIG. 4 for example, it is desirable to minimize the parasitic capacitance of the FD node 116 which serves as the input node of the amplification transistor 114 functioning as a source follower.

It is thus also desirable to sustain the amplitude of an electrical signal output by the amplification transistor 114 in accordance with incidence of a photon at a magnitude sufficiently greater than random noises generated by the amplification transistor 114.

On the other hand, the electrical signal output by the pixel is not required to have good linearity, a high degree of precision and a large dynamic range which are required for the electrical signal output by the analog pixel. Thus, as the input/output power supply of the source follower, for example, a low-voltage power supply for digital circuits can be used. In addition, it is possible to make use of a photodiode which has a smallest possible electric-charge accumulation capacity.

Next, the following description explains an outline of the whole operation carried out by the CMOS image sensor 100 according to the first embodiment.

As described before, each of the pixel blocks 160-0, 160-1, 160-2, 160-3 and so on is configured to employ 128 digital pixels DPX and a pixel select circuit. The pixel select circuit is a circuit for selecting one of the 128 digital pixels DPX and carrying out a reset or read operation on the selected pixel.

To put it more concretely, in the first embodiment, one pixel included in a pixel block 160 is selected by row control lines 181 and 182 which are driven by the row driving circuit 170.

In the read operation cited above, the selected pixel outputs an electrical signal to one of the sense circuits 121-0, 121-1, 121-2, 121-3 and so on through one of the output signal lines 131-0, 131-1, 131-2, 131-3 and so on respectively to serve as a signal which indicates whether or not photons have hit the selected pixel. On the basis of the electrical signal, the sense circuit 121 generates a binary value representing a result of determination.

Typically, the sense circuit 121 (one of the sense circuits 121-0, 121-1, 121-2, 121-3 and so on) generates a binary value of 1 if photons have hit the selected digital pixel DPX. If no photons have hit the selected pixel, on the other hand, the sense circuit 121 (one of the sense circuits 121-0, 121-1, 121-2, 121-3 and so on) generates a binary value of 0. The sense circuit 121 confirms the generated binary value by latching the binary value therein.

First of all, the binary value output by the sense circuit 121 (one of the sense circuits 121-0, 121-1, 121-2, 121-3 and so on) to serve as the result of the above determination is stored in the register 151 (one of the registers 151-0, 151-1, 151-2, 151-3 and so on respectively).

As described before, the count circuit 153 is shared by the four pixel blocks 160-0 to 160-03. That is to say, the count circuit 153 is shared by the four registers 151-0 to 151-3 which are used for storing the determination results produced for four selected pixels pertaining to the four pixel blocks 160-0 to 160-03 respectively. The four selected pixels are on the same row selected by the row driving circuit 170 among rows of the pixel array section 110. The four determination results each represented by a binary value are sequentially transferred to the determination-result integration circuit section 150 by way of the register select circuit 152 which selected one of the four determination results at a time.

A count (or integration) result produced by the determination-result integration circuit section 150 for every pixel is then stored in the memory 154.

First of all, in a loading operation, pixel data, which has been stored in the memory 154 in a previous pixel read operation, is loaded to the count circuit 153.

Then, the count circuit 153 increments the integration result loaded from the memory 154 by 1 in order to produce a new integration result if the determination result stored in the register 151 is the binary value of 1. If the determination result stored in the register 151 is the binary value of 0, on the other hand, the count circuit 153 does not update the integration result loaded from the memory 154.

Then, the count circuit 153 stores the new integration result back in the memory 154, terminating the counting operation for a digital pixel DPX. The counting operation is carried out on the four digital pixels DPX sequentially from one pixel to another.

While the counting operation is being carried out, the sense circuit 121-0 to 121-3 can carry out read and determination operations concurrently on the next selected row.

The read operation to read out an electrical signal from a pixel as described above is carried out 1,023 times during one frame period in order to generate 10-bit gradation data for every pixel.

Since the integration result stored in the memory 154 to be processed by the count circuit 153 is a 10-bit result and the memory 154 is used for storing integration results for 512 (=128×4) pixels, the memory 154 is required to have a storage capacity of at least 5,120 bits.

As is obvious from the above description, the CMOS image sensor 100 has a unique configuration including the pixel array section 110 and functions as a photon counter.

By the way, the required size of the count circuit 153 and the required storage capacity of the memory 154 vary in accordance with the application of the CMOS image sensor 100.

For example, let the image taking unit be a unit composed of 4×4 pixels, that is, let the vertical and horizontal dimensions of the image taking unit be each four pixels. In this case, the pixel data for every image taking unit can be stored in the memory 154 at the same address.

That is to say, the integration result is stored in the memory 154 for every 16 pixels to be incremented by the count circuit 153.

In the case of an image unit composed of 4×4 pixels, the integration result is 16 times the integration result for the configuration of the CMOS image sensor 100 according to the first embodiment described above. In this case, the count circuit 153 is required to have a size of 14 bits.

On the other hand, the number of addresses each assigned to a storage location in the memory 154 is reduced to 32 which is 1/16 times the address count for the first embodiment. As described above, at each of the 32 addresses, an integration result having a size of 14 bits is stored. Thus, the storage capacity of the memory 154 is 448 bits.

In an alternative configuration, the integration result is a result of counting the total number of photons incident on the entire light receiving surface. In this alternative configuration, the count circuit 153 is used also for holding the integration result as it is. Thus, the memory 154 is not always required.

In this case, the bit count of the counter is 19 bits which is greater than 10 bits by 9 bits corresponding to 512 pixels.

Another alternative configuration allows function switching in order to adapt the function to a variety of processes ranging from a two-dimensional image taking process carried out on all pixels to a total integration process carried out for integration results. For this, there are provided a 14-bit count circuit 153 and a memory 154 used for storing 14-bit integration result for each of (128×4) pixels. In addition, the level of the circuit block 200 is made capable of carrying out a cumulative addition on integration results each obtained for 4×4 pixels.

In order to carry out a cumulative addition for all pixels, first of all, the circuit block 200 carries out an addition on integration results each obtained for 4×4 pixels and the integration result produced as a result of the cumulative addition is stored in the memory 154. An external circuit of an output section is used as a separate adder for carrying out a cumulative addition on a plurality of integration results which have been stored in the memory 154. In this other alternative configuration, the amount of the cumulative addition processing carried out by the external adder of the output section is 1/16 times that of a configuration in which there is no cumulative addition carried out on integration results each obtained for 4×4 pixels. Thus, the external adder of the output section is not required to carry out a cumulative addition at a high speed.

Next, the following description explains cyclical accesses made to a pixel block according to the first embodiment.

Figure 5:
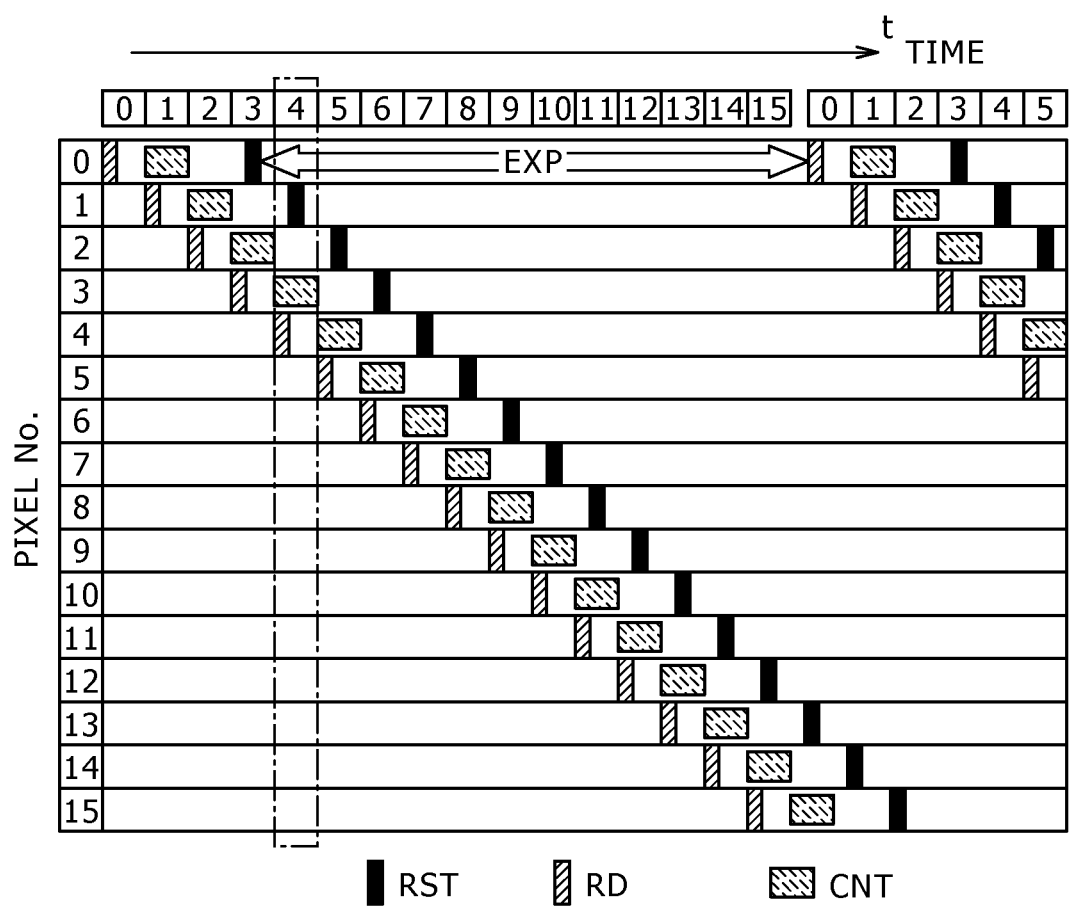
FIG. 5 is an explanatory diagram to be referred to in description of cyclical accesses to a pixel block in the first embodiment.

FIG. 5 is an explanatory diagram to be referred to in description of cyclical accesses to a pixel block in the first embodiment.

It is to be noted that, in order to make the diagram of FIG. 5 simpler, the figure shows only an exemplary configuration. In this configuration, a pixel block includes only 16 pixels which share one sense circuit.

The 16 pixels included in each of the pixel blocks 160-0 to 160-3 and so on are accessed cyclically and sequentially.

In this case, the frame rate is set at 30 frames per second or the frame period is set at 1/30 seconds. During the frame period of 1/30 seconds, for every pixel, an electrical signal is read out 1,023 times. Thus, it takes about 32 microseconds to carry out one cycle of block processing. That is to say, it is necessary to complete read operations for 16 pixels during a cycle of 32 microseconds.

The horizontal axis t of the diagram of FIG. 5 is the time axis. Each time segment on the time axis t is a time period allocated to an access made to a pixel. The length of the time segment is not greater than two microseconds.

It is to be noted that, in the configuration shown in the block diagram of FIG. 1, each of the pixel blocks 160-0 to 160-3 includes 128 pixels. In this case, it takes about 250 nanoseconds to make an access to one pixel.

An operation to read out data from a pixel and an operation to produce a result of determination based on the data are each a simple operation similar to an operation to read out data from a semiconductor memory. Thus, a time period having a length of about 250 nanoseconds is a period having a sufficient margin.

As shown in the diagram of FIG. 5, a cyclical access to a pixel DPX can be a RD (read) operation or a RST (reset) operation which is carried out after the RD operation.

In this case, the access timings of the RST and RD accesses vary from pixel to pixel. However, the length of the real exposure EXP stretched from the RST access to the RD access is uniform for pixels.

By shifting the timing of the RST access to a timing within the range of the cycle, the exposure time can be changed. Thus, the sensitivity can be adjusted without affecting other circuit operations.

For example, by setting the timing of the RST access for every pixel DPX at a timing set right after the timing of the immediately preceding RD access (a timing in the same time segment as the RD access) for the same digital pixel DPX, the exposure time can be increased to a maximum value which is proper for an image taking object with a low illumination level.

Conversely, by setting the timing of the RST access for every pixel DPX at a timing set right before the timing of the immediately succeeding RD access (a timing in the time segment of the immediately succeeding RD access) for the same digital pixel DPX, the exposure time can be decreased to a minimum value which is proper for an image taking object with a high illumination level. As an alternative, by setting the timing of the RST access at a timing properly selected from a plurality of timings in the same time segment, the exposure time can be changed with a higher degree of freedom.

After an RD access, count processing CNT is carried out. In addition, an RD access to the next pixel can be carried out concurrently with the count processing CNT.

For example, at a time t4, an RD access is made to pixel No. 4 and an RST access is made to pixel No. 1. Also at the time t4, the count processing CNT is carried out on pixel No. 3 concurrently with the RD access made to pixel No. 4 and the RST access made to pixel No. 1.

In the example described above, the RD access to pixel No. 4 and the RST access to pixel No. 1 are made sequentially on a time division basis. In the case of a pixel shown in the circuit diagram of FIG. 4 to serve as a pixel having an internal independent reset mechanism of its own, the RD access to pixel No. 4 and the RST access to pixel No. 1 can also be made concurrently at the same time by applying a two-system driving technique to the row control lines.

As described earlier, the first embodiment has a hierarchical structure in which a plurality of pixels DPX share the sense circuit 121 (that is, one of the sense circuits 121-0 to 121-3) and the register 151 (that is, one of the registers 151-0 to 151-3) whereas the sense circuits 121-0 to 121-3 share the count circuit 153.

The ratios of sharing are optimized on the basis of relations between access times described above and areas occupied by circuits.

By the way, the circuit blocks 200 each shown in the block diagram of FIG. 1 can be laid out in the horizontal direction (or the row direction) of the pixel array section 110. As described before, the circuit block 200 has four pixel blocks.

By laying out 32 circuit blocks 200 in the horizontal direction and driving the 32 circuit blocks 200 to operate concurrently with each other for example, a light receiving apparatus can be configured to employ 128×128 pixels. The performance of such a light receiving apparatus can be estimated as follows.

Let each pixel generate 10-bit image taking data at a frame rate of 30 frames per second.

In this case, if a sum of the integration results for all pixels is computed to be used as a single integration result, the maximum value of the integration-process total count per second is 500 megas (=128×128×1,023×30).

Even if only the linear area of the Poisson distribution is used, the maximum value is still 200 megas. Thus, if a correction process is carried out, an integration process can be carried out for a count greater than this value.

In addition, as explained earlier, depending on the application, such a light receiving apparatus can also be used for carrying out a two-dimensional image taking operation and used as a single light receiving apparatus for counting the number of photons.

In either case, by updating the contents of the internal registers through external means, the operation mode can be changed with ease. In addition, a program can be executed to shift the reset timings in order to change the exposure time by adoption of the same method.

By the way, every digital pixel used in the first embodiment employs an opto-electrical conversion element as described before. That is to say, every digital pixel has a function to generate an electrical signal in accordance with incidence of photons on the digital pixel. A configuration of the digital pixel is shown in the circuit diagram of FIG. 4.

It is to be noted that, in an operation to read out data (electrical signals) from digital pixels, it is necessary to eliminate electrical-signal variations of every digital pixel. Thus, it is desirable to introduce the following self referencing function to be carried out at a sensing time.

An electrical signal output in a reset state and an electrical signal output after the exposure time are read out from a pixel. Then, the sense circuit adds an offset determined in advance to either the electrical signal output in a reset state or the electrical signal output after the exposure time. Finally, the sense circuit generates a binary value representing a result of determination carried out by comparison of both the electrical signals with each other.

FIG. 6 is a circuit diagram showing a sense circuit having the self referencing function mentioned above.

As shown in the circuit diagram of FIG. 6, the sense circuit 121A employs switches SW121, SW122 and SW123, capacitors C121 and C122, inverters IV121 and IV122 as well as an offset supply line L121 for adding an offset signal OFFSET to an input electrical signal SIG.

A node a of the switch SW121 is connected to the first node of the capacitor C121 and the first node of the capacitor C122.

A node b of the switch SW121 is connected to a node SIG which is wired to an output signal line.

The second node of the capacitor C121 is connected to the input node of the inverter IV121, a node a of the switch SW122 and a node a of the switch SW123.

The second node of the capacitor C122 is connected to the offset supply line L121 for supplying the offset signal OFFSET.

The output node of the inverter IV121 is connected to the input node of the inverter IV122 and a node b of the switch SW122.

The output node of the inverter IV122 is connected to a node b of the switch SW123 and an output node SAOUT.

The following description explains an operation carried out by the sense circuit to read out an electrical signal from a pixel shown in the circuit diagram of FIG. 4. The sense circuit has the self referencing function as shown in the circuit diagram of FIG. 6.

FIGS. 7A to 7F are a timing diagram showing a plurality of timing charts to be referred to in explanation of read operations carried out by the sense circuit shown in the circuit diagram of FIG. 6 to serve as a sense circuit having a self referencing function by taking the pixel shown in the circuit diagram of FIG. 4 as an example.

To be more specific, FIG. 7A is a diagram showing the timing chart of a reset pulse signal RESET applied to the reset line 182 shown in the circuit diagram of FIG. 4 whereas FIG. 7B is a diagram showing the timing chart of a read pulse signal READ applied to the transfer line 181 shown in the circuit diagram of FIG. 4.

FIG. 7C is a diagram showing the timing chart of turned-on and turned-off states of the switch SW121, FIG. 7D is a diagram showing the timing chart of turned-on and turned-off states of the switch SW122, FIG. 7E is a diagram showing the timing chart of turned-on and turned-off states of the switch SW123 whereas FIG. 7F is a diagram showing the timing chart of the offset signal OFFSET.

First of all, each of the switch SW121 and the switch SW122 is put in a turned-on state whereas the reset pulse signal RESET is applied to the reset line 182 of the pixel DPX in order to transfer an electrical signal generated by the pixel DPX in a reset state to the input node SIG.

Then, the switch SW122 is put in a turned-off (OFF) state in order to hold the electrical signal generated by the pixel DPX in a reset state.

Subsequently, the read pulse signal READ is applied to the transfer line 181 of the pixel DPX in order to transfer an electrical signal generated by the pixel DPX as a result of an exposure to the input node SIG. Then, the switch SW121 is put in a turned-off state.

In the mean time, the input offset signal OFFSET is sustained at 0V.

Next, the level of the offset signal OFFSET is raised a little bit in order to add an offset electric potential to the input electrical signal through the capacitor C122.

Thus, the electrical signal generated by the pixel DPX in a reset state is compared with the sum of the offset electric potential and the electrical signal generated by the pixel DPX as a result of an exposure.

If an incident photon has hit the pixel shown in the circuit diagram of FIG. 4, the latter signal has an electric potential lower than the former signal. Thus, an output signal of 0 appears at the output node SAOUT.

If no photon has hit the pixel, on the other hand, the latter signal conversely has an electric potential higher than the former signal. Thus, an output signal of 1 appears at the output node SAOUT.

Finally, the switch SW123 is put in a turned-on state in order to latch the result of the determination.

The self referencing function described above eliminates fixed noises generated by every pixel due to causes which include threshold-voltage variations among the amplification transistors 114. Thus, accurate binary determination is possible even for a small electric signal. In addition, in the sequence described above, kTC noises generated in the reset state are also eliminated.

It is to be noted that similar effects can be expected even for CDS (Correlation Double Sampling) in the AD conversion of the analog electrical signal into a binary value.

It is also worth noting, however, that the time it takes to carry out two read operations and a determination process in the sensing processing for the binary determination is always fixed as well. Thus, the effect of thermal and flicker noises generated by the amplification transistor of the pixel and the sense circuit itself can also be reduced as follows.

Most of noises generated in one of the two read operations as noises in a low-frequency range are superposed on noises generated in the other read operation as noises in a low-frequency range so that the effect of the noises can be eliminated. In addition, the effect of noises generated in a high-frequency range can be limited by a capacitive load imposed by the sense circuit.

Thus, by setting the magnitude of the capacitive load at a largest possible value in the range of correct sensing operations, the band of noises having the effect can be reduced to a minimum value.

During the correlation double sampling in the AD conversion, the time it takes to carry out the conversion usually changes in accordance with the magnitude of the analog electrical signal and the number of bits. In consequence, the effect of a broad noise band is inevitably exhibited.

The circuit does not have to be the example. In addition, it is possible to provide a sense circuit in which the sum of an offset electric potential and the electrical signal generated by the pixel in a reset state is compared with the electrical signal generated by the pixel as a result of an exposure.

In an alternative sense circuit, an electrical signal is read out from the pixel first. Then, the pixel is put in a reset state and an input electrical signal generated in the reset state is read out from the pixel. The offset electric potential can be added to one of the two electrical signals read out from the pixel prior to the comparison of the two electrical signals with each other. In this alternative sense circuit, even though kTC noises cannot be eliminated, noises including fixed ones generated by variations from pixel to pixel can be extinguished. Thus, the alternative sense circuit has a merit that the circuit can be applied generally to all pixel configurations.

Even with the self referencing function included, the sense circuit has much fewer components than the ordinary AD converter so that the sense circuit does not entail a large area to be occupied by the sense circuit.

Another alternative offers an effective option to make use of a photodiode having an embedded internal amplifier as the aforementioned opto-electrical conversion element employed in the digital pixel DPX.

An example of the photodiode having an embedded internal amplifier is an APD (Avalanche Photodiode) which makes use of an electric field for accelerating an electron-hole pair obtained as a result of opto-electrical conversion in order to carry out avalanche amplification.

Also in the case of this other alternative, the pixel circuit like the one shown in the circuit diagram of FIG. 4 can be used. If a sufficiently large electrical signal can be generated by the photodiode having an embedded internal amplifier, however, the amplification transistor is not required in the digital pixel DPX.

3. Second Embodiment

The following description explains a second embodiment which implements a configuration of applying the photodiode having an embedded internal amplifier to a light receiving apparatus.

Figure 8:
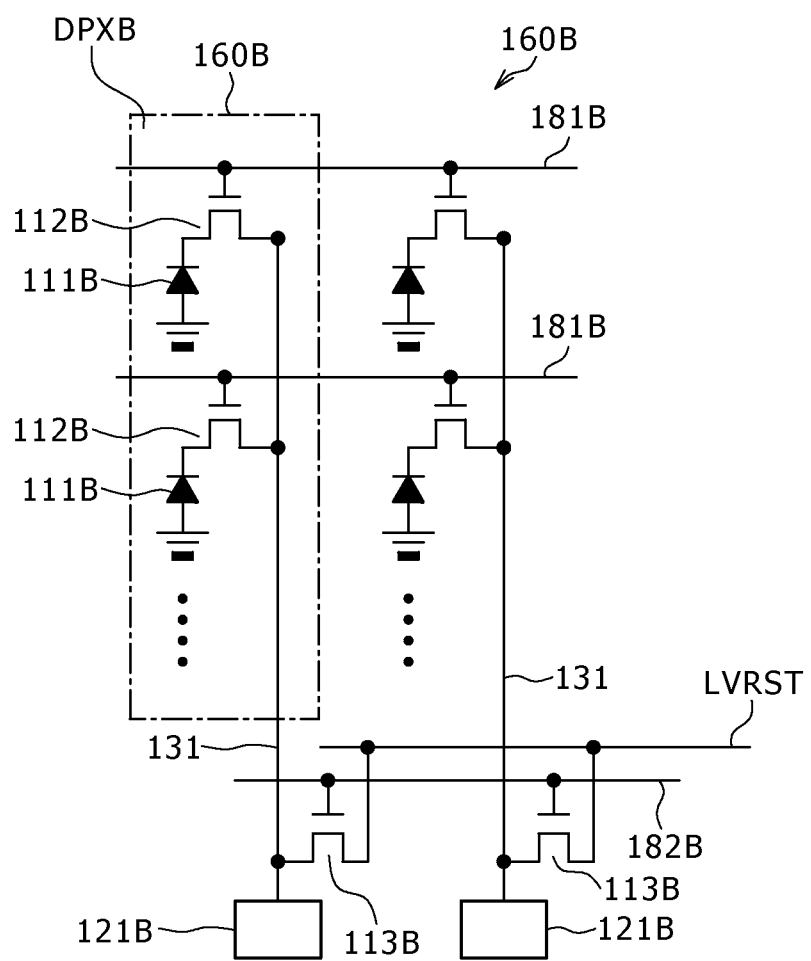
FIG. 8 is an explanatory diagram showing a configuration of pixel blocks each containing digital pixels each provided with an internal-amplifier photodiode in accordance with a second embodiment of the present invention to serve as a counterpart of a pixel block according to the first embodiment.

FIG. 8 is an explanatory diagram showing a configuration of pixel blocks each provided with an internal-amplifier photodiode in accordance with the second embodiment of the present invention to serve as a counterpart of a pixel block according to the first embodiment.

In the case of the second embodiment, the pixel block 160B is configured as a group of pixels DPXB which each include only an internal-amplifier photodiode 111B and a transport (select) transistor 112B for the internal-amplifier photodiode 111B.

That is to say, every pixel DPXB is configured to include only an internal-amplifier photodiode 111B and a transfer (select) transistor 112B for the internal-amplifier photodiode 111B. The gate electrodes of the transfer (select) transistors 112B employed in the digital pixels DPXB provided on the same row are connected to a common transfer line 181B. The source or drain electrodes of the transfer transistors employed in the pixels included in a pixel block 160B are connected to a common output signal line 131.

In addition, a reset transistor 113B is connected between an output signal line 131 and a reset electric-potential line LVRST. Each output signal line 131 is connected to (i.e., is in communication with) a corresponding sense circuit 121B. The gate electrodes of the reset transistors 113B are connected to a common reset line 182B.

In the case of the second embodiment, every pixel DPXB is reset by a reset signal which propagates through the reset transistor 113B, the output signal line 131 and the transfer transistor 112B.

4. Third Embodiment

The following description explains a third embodiment which implements a configuration of an image taking apparatus making use of a plurality of light receiving apparatus each based on an image taking device according to the first or second embodiment. Each of the light receiving apparatus employs a light receiving section and circuit blocks.

The semiconductor image taking apparatus represented by sensors including the ordinary CCD (Charge Coupled Device)-type image taking sensor and the ordinary CMOS image sensor has characteristic variations of an amplifier circuit at the CCD output section and characteristic variations of a source follower circuit pertaining to every pixel in the CMOS image sensor.

In the ordinary semiconductor image taking apparatus, the characteristic variations are reflected as they are in variations of the efficiency of a process to convert the number of accumulated photons into an analog electrical signal.

In addition, the conversion variations of an AD converter are also directly reflected in signal variations. Thus, effective-sensitivity variations from chip to chip are also very large.

As a result, in an image taking operation carried out on a large area of an image taking object by making use of a plurality of ordinary semiconductor image taking apparatus arranged to serve as parallel apparatus, the gain of every chip must be adjusted in order to make the sensitivities of the chips uniform.

On the other hand, in the image taking device provided in accordance with the embodiments of the present invention to serve as a light receiving apparatus counting the number of photon on a time division basis, analog signals are basically not handled. Thus, sensitivity variations from chip to chip are extremely small.

As a result, by arranging such light receiving apparatus to form a one-dimensional line in an image taking apparatus or a two-dimensional matrix in the image taking apparatus, it is possible to carry out an image taking operation on a large area of an image taking object.

By providing scintillators on the front surface of such a light receiving apparatus for example, the image taking apparatus can be used in medical cares or in an operation to take an image based on radiated X rays for a security check purpose. Since the image taking apparatus exhibits a high sensitivity by generating only few noises, an image can be taken with a high degree of precision even if only few radiated X rays are used.

Thus, in an image taking operation carried out in a medical care of a patient serving as an image taking object for example, the amount of contamination in the patient can be reduced substantially by decreasing the number of radiated X rays and the strength of each of the radiated X rays.

Figure 9A:
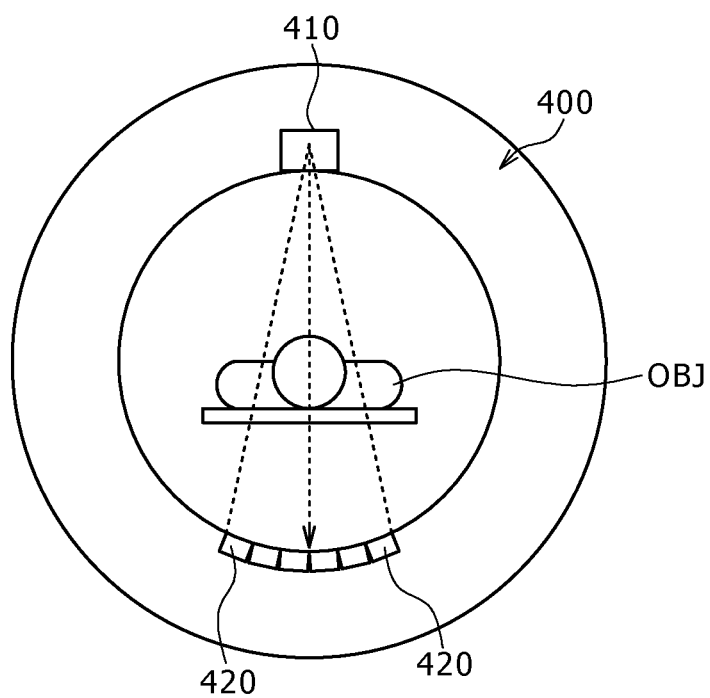
FIGS. 9A and 9B are a plurality of conceptual diagrams showing an image taking apparatus which applies image taking devices according to a third embodiment of the present invention to a CT (Computer Tomography) image taking operation.
Figure 9B:
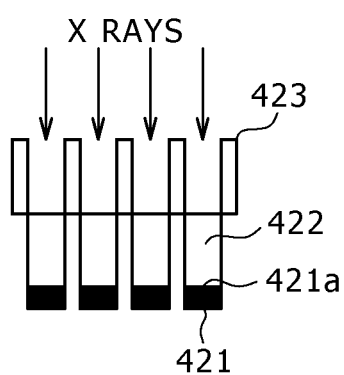

FIGS. 9A and 9B are a plurality of conceptual diagrams showing an image taking apparatus which applies image taking devices according to the third embodiment of the present invention to a CT (Computer Tomography) image taking operation.

An image taking apparatus 400 is a cylinder enclosing an image taking object OBJ. The image taking apparatus 400 employs an X-ray source 410 and several thousands of image taking devices 420 each making use of a photon counter according to the third embodiment of the present invention. The image taking devices 420 are arranged to form an array which faces the X-ray source 410.

The surface of the array is bent over the inner wall of the cylinder. Thus, the image taking devices 420 have a uniform distance to the X-ray source 410.

As shown in the diagram of FIG. 9B, each of the image taking devices 420 has a scintillator 422 and a collimator 423. The scintillator 422 is provided on the light receiving surface 421a side of a photon counter 421 according to the third embodiment of the present invention. On the other hand, the collimator 423 is provided on the side of incidence of X rays.

An X ray generated by the X-ray source 410 propagates through the image taking object OBJ and passes through the collimator 423. The scintillator 422 converts the X ray into a visible light beam which is detected by the photon counter 421 in order to find the radiation quantity of the X ray.

The image taking apparatus 400 is rotating around the image taking object OBJ in order to take an image of the image taking object OBJ at every image taking angle. Then, data representing the images is processed in order to generate a cross-sectional transmission image of the image taking object OBJ.

Not only does the photon counter of an image taking device according to the third embodiment of the present invention generate no noises during a read operation carried out with a high degree of sensitivity, but the photon counter also offers an extremely large dynamic range.

In addition, the image taking device has an embedded count circuit and is capable of taking an image at a high speed even for a high bit resolution. Thus, even if the number of X rays and the intensity of each of the X rays are reduced substantially, the image taking process can be carried out with a high degree of precision. On top of that, a system employing the image taking apparatus 400 can be constructed at a low cost.

Figure 10:
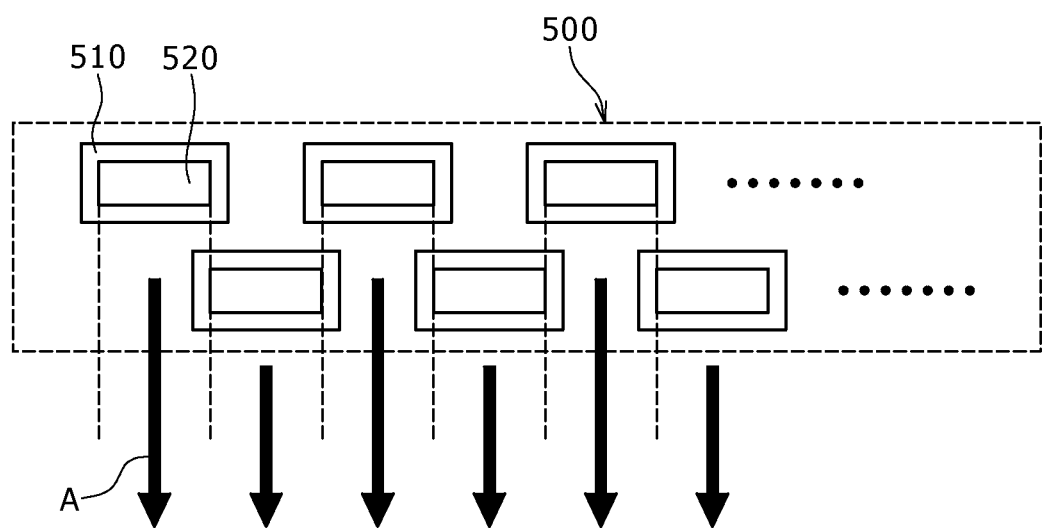
FIG. 10 is a diagram showing a line-type image taking apparatus including image taking devices laid out along one-dimensional lines to serve as light receiving devices according to the third embodiment of the present invention.

FIG. 10 is a diagram showing a line-type image taking apparatus including image taking devices laid out along one-dimensional lines to serve as light receiving devices according to the third embodiment of the present invention.

To put it in detail, in the line-type image taking apparatus 500, the image taking devices 510 are laid out along two one-dimensional lines in an alternate manner to serve as light receiving devices according to the third embodiment.

By moving the line-type image taking apparatus 500 in a direction indicated by arrows A, it is possible to make use of effective pixel areas 520 of the image taking devices 510 each serving as a light receiving device to evenly scan a wide image taking area.

It is desirable to move the line-type image taking apparatus 500 in a scan operation on a step-by-step basis with each step set at the vertical-direction (column-direction) pitch of the effective pixel area 520. As an alternative, instead of moving the line-type image taking apparatus 500, it is the image taking object which is moved. A link between two adjacent effective pixel areas may include some pixels common to the two adjacent effective pixel areas. In this case, an averaging process may need to be carried out.

It is possible to construct a configuration by laying out the effective pixel areas 520 of 128 image taking devices 510 each serving as a light receiving device in the horizontal direction (that is, the row direction) in the same way as pixel blocks are laid out in the pixel array section shown in the block diagram of FIG. 1. Thus, it is possible to configure a light receiving apparatus to employ 512×128 physical pixels.

Let a block of 8×8 physical pixels be taken as a pixel unit in the image taking operation to find a sum of count values computed for every pixel unit. In the following description, the pixel unit is also referred to as a logical pixel. In this case, the 512×128 physical pixels can be handled in the image taking operation as 64×16 logical pixels. Since every physical pixel typically has a resolution of 10 bits, each logical pixel composed of 64 physical pixels has a resolution of 16 bits.

If 64 image taking devices 510 each serving as a light receiving device are arranged to form a line as shown in the diagram of FIG. 10 as described above, the line-type image taking apparatus 500 includes a total of 4,096 logical pixels each having a resolution of 16 bits.

As is obvious from the above description, the line-type image taking apparatus is capable of finely carrying out an image taking operation with ease. By making use of the line-type image taking apparatus in conjunction with a scintillator for example, the line-type image taking apparatus can be used to take an image based on radiated X rays in medical cares or for a security check purpose. In this case, the line-type image taking apparatus 500 is capable of taking an image with a high degree of precision and with a very high degree of sensitivity since only few noises are generated in the image taking operation.

The amount of contamination in the image taking object can be reduced substantially by decreasing the number of radiated X rays and the strength of each of the radiated X rays. As a result, a system employing the line-type image taking apparatus can be constructed at a very low cost. As an alternative, it is possible to move the line-type image taking apparatus in a scan operation on a step-by-step basis with each step set at the scanning-direction pitch of the effective pixel area. Thus, the scan distance can be shortened. As a result, the amount of contamination can be further reduced.

It is to be noted that the solid-state image taking devices according to the first and second embodiments described above can each be used as an image taking device employed in a digital camera or a video camera.

5. Fourth Embodiment

Figure 11:
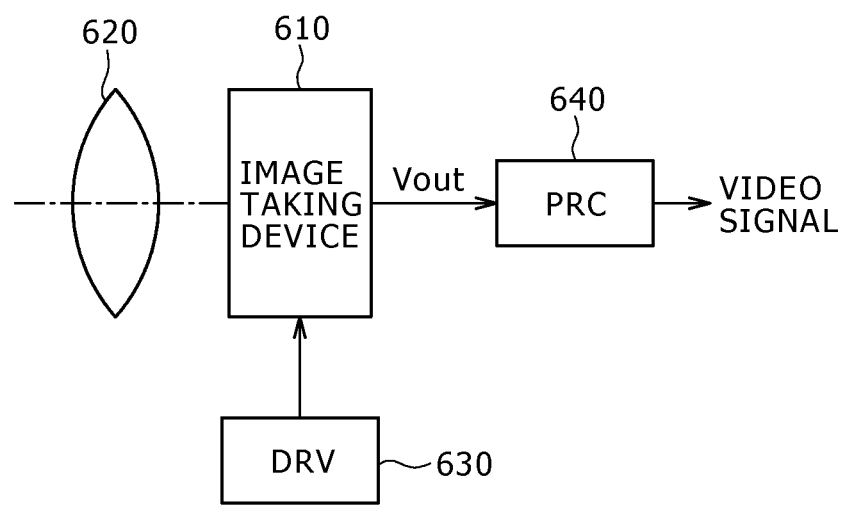
FIG. 11 is a block diagram showing a configuration of a camera system employing a solid-state image taking device according to a fourth embodiment of the present invention.

FIG. 11 is a block diagram showing a configuration of a camera system employing an image taking device according to a fourth embodiment of the present invention.

As shown in the block diagram of FIG. 11, the camera system 600 includes an image taking device 610 which can be implemented by the CMOS image sensor 100 provided by the first embodiment to serve as an image taking device.

The camera system 600 also has an optical system for guiding incident light to the pixel area of the solid-state image taking device 610 and creating an image of an image taking object on the pixel area. An example of the optical system is a lens 620 used for creating an image based on the incident light on the pixel area.

In addition, the camera system 600 also employs a device driving circuit (DRV) 630 and a signal processing circuit (PRC) 640. The device driving circuit (DRV) 630 is a section for driving the image taking device 610 whereas the signal processing circuit (PRC) 640 is a section for processing a signal output by the image taking device 610.

The device driving circuit 630 has a timing generator (not shown) for generating a variety of timing signals including a start pulse signal and a clock pulse signal which are used for driving circuits employed in the image taking device 610. The device driving circuit 630 drives the image taking device 610 with timings determined by a predetermined timing signal.

On the other hand, the signal processing circuit 640 carries out signal processing determined in advance on a signal output by the image taking device 610.

An image signal output by the signal processing circuit 640 as a result of the signal processing is stored as image information in a recording medium such as a memory. An apparatus such as a printer can be used for producing a hard copy of the image information stored in the recording medium. As an alternative, the image signal output by the signal processing circuit 640 as a result of the signal processing is displayed as a moving picture on a monitor such as a liquid-crystal display apparatus.

As described above, in an image taking apparatus such as a digital still camera, a solid-state image taking apparatus 100 as described earlier can be employed as the image taking device 610 in order to implement a camera which has a low power consumption and offers excellent precision.

By the way, the configuration allowing a plurality of pixels to share a common sense circuit as shown in the block diagram of FIG. 1 is absolutely required for a case in which the pixels and the sense circuit are provided on a common semiconductor substrate. In recent years, however, a wafer sticking technology is utilized to develop an offspring technology for creating a multi-layer structure including a plurality of semiconductor layers. The technology also offers an option to provide a sense circuit for each of pixels on typically a lower layer beneath a layer for the pixels. By virtue of the technology for creating a multi-layer structure, it is possible to allow a plurality of sense circuits to share an integrated circuit which include a counter and the like. As a result, it is possible to easily find a sum of processing results computed for different pixels and increase the dynamic range.

It should be understood by those skilled in the art that various modifications, combinations, sub-combinations and alternations may occur depending on design requirements and other factors insofar as they are within the scope of the appended claims or the equivalent thereof.

What is claimed is:

1. An image sensor comprising:
   a pixel array section with pixels, each of which generates an electrical signal related to incident light;
   a sense section with a plurality of sense circuits, each sense circuit receiving electrical signals from a plurality pixels and generating data related to the electrical signals; and
   an integration circuit section with a plurality of registers, a selection circuit and a count circuit,
   wherein,
   the sense section is electrically connected between the pixels and the integration circuit section,
   the selection circuit is electrically connected between the sense section and the count circuit,
   the selection circuit selectively supplies the data to the count circuit; and
   the plurality of the sense circuits are shared by the count circuit.

2. The image sensor according to claim 1, wherein the registers are electrically between the sense circuit and the selection circuit, and the selection circuit sequentially transfers the data from the plurality of registers to the count circuit.

3. The image sensor according to claim 1, wherein the plurality of pixels include a set of pixels, the set of pixels being connected to a common signal line that is in communication with a corresponding sense circuit.

4. The image sensor according to claim 3, further comprising a reset transistor connected between the common signal line and a reset electric-potential line.

5. The image sensor according to claim 4, wherein at least one of the pixels includes an internal-amplifier photodiode and a transfer transistor.

6. The image sensor according to claim 3, wherein electrical signals from the set of pixels are read out in a cyclical manner by the corresponding sense circuit.

7. The image sensor according to claim 1, wherein the data that is generated by the sense circuit is a binary value.

8. The image sensor according to claim 1, wherein at least one of the sense circuits reads out the electrical signals from at least one pixel associated with the sense circuit in order to generate the data, the data representing whether or not photons have been incident on the one pixel within a predetermined time period.

9. The image sensor according to claim 1, wherein at least one of the registers is configured to store data from the corresponding sense circuit.

10. The image sensor according to claim 1, wherein the count circuit is in selective communication with at least one of the plurality of registers by means of the selection circuit and is configured to provide integration results for the plurality of pixels associated with the plurality of sense circuits based on the data received from the plurality of sense circuits.

11. An electronic system comprising:
    an optical system with a lens; and
    an image sensor system configured to receive incident light from the optical system, the image sensor including:
    a pixel array section with pixels, each of which generates an electrical signal related to incident light;
    a sense section with a plurality of sense circuits, each sense circuit receiving electrical signals from a plurality of pixels and generating data related to the electrical signals; and
    an integration circuit with a plurality of registers, a selection circuit and a count circuit,
    wherein,
    the sense section is electrically connected between the pixels and the integration circuit section,
    the selection circuit is electrically connected between the sense section and the count circuit,
    the selection circuit selectively supplies the data to the count circuit, and
    the plurality of the sense circuits are shared by the count circuit.

12. The electronic system according to claim 11, wherein the registers are electrically between the sense circuit and the selection circuit, and the selection circuit sequentially transfers the data from the plurality of registers to the count circuit.

13. The electronic system according to claim 11, wherein the plurality of pixels include a set of pixels, the set of pixels being connected to a common signal line that is in communication with a corresponding sense circuit.

14. The electronic system according to claim 13, further comprising:
    a reset transistor connected between the common signal line and a reset electric-potential line.

15. The electronic system according to claim 14, wherein at least one of the pixels includes an internal-amplifier photodiode and a transfer transistor.

16. The electronic system according to claim 13, wherein electrical signals from the set of pixels are read out in a cyclical manner by the corresponding sense circuit.

17. The electronic system according to claim 11, wherein the data that is generated by the sense section is binary data.

18. The electronic system according to claim 11, wherein at least one of the sense circuits reads out the electrical signals from at least one pixel associated with the sense circuit in order to generate the data, the data representing whether or not photons have been on the one pixel within a predetermined time period.

19. The electronic system according to claim 11, wherein at least one of the registers is configured to store data from the corresponding sense circuit.

20. The electronic system according to claim 11, wherein the count circuit is in selective communication with at least one of the plurality of registers by means of the selection circuit and is configured to provide integration results for the plurality of pixels associated with the plurality of sense circuits based on the data received from the plurality of sense circuits.

21. The electronic system according to claim 11 wherein the data that is generated by each of the plurality of sense circuits is a binary data.

22. The electronic system according to claim 11 further comprising a memory to store the integration result for each of the plurality of pixels.

23. The electronic system according to claim 11 wherein the count circuit is configured to compute a sum for the integration results of the plurality of pixels and supply the sum to a memory.

* * * * *